Feb. 21, 1967     J. L. VIECELI ETAL     3,304,636
HEATING AND STEAM GENERATING SUBASSEMBLY FOR A PRESSING IRON
Filed Aug. 5, 1963                          6 Sheets-Sheet 1
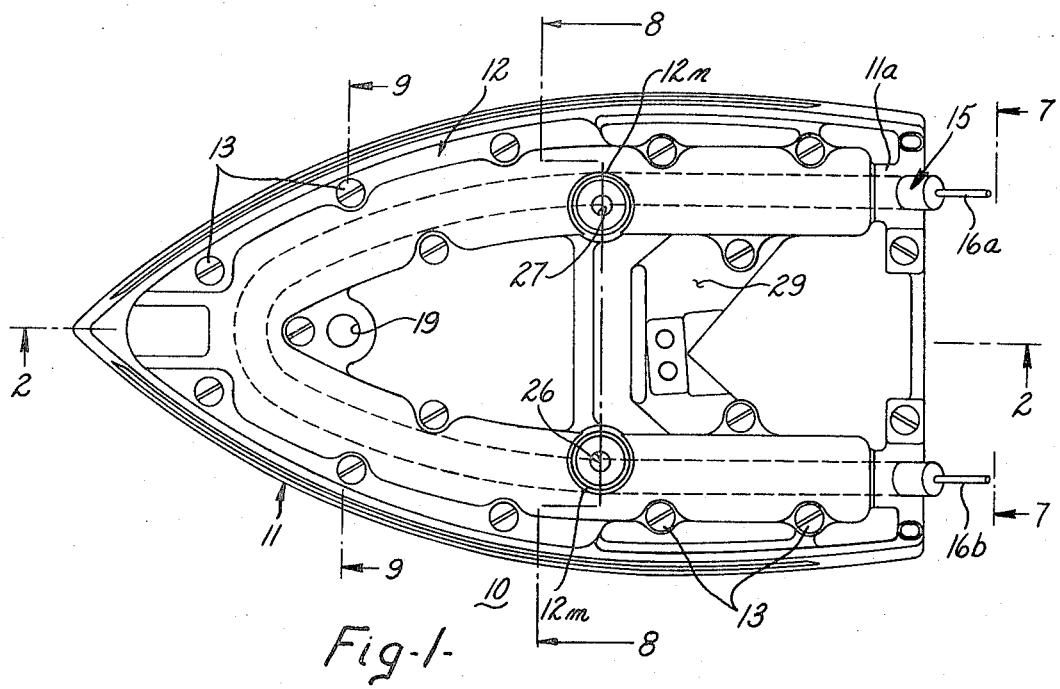
Fig-1-
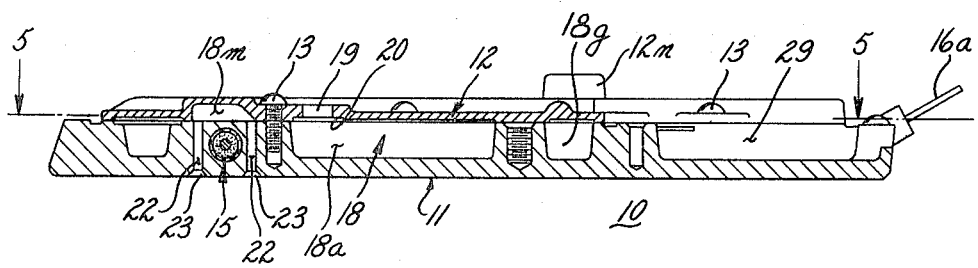
Fig-2-
INVENTORS
JOSEPH L. VIECELI
STANLEY WALCZAK
BY
George R. Clark
Attorney

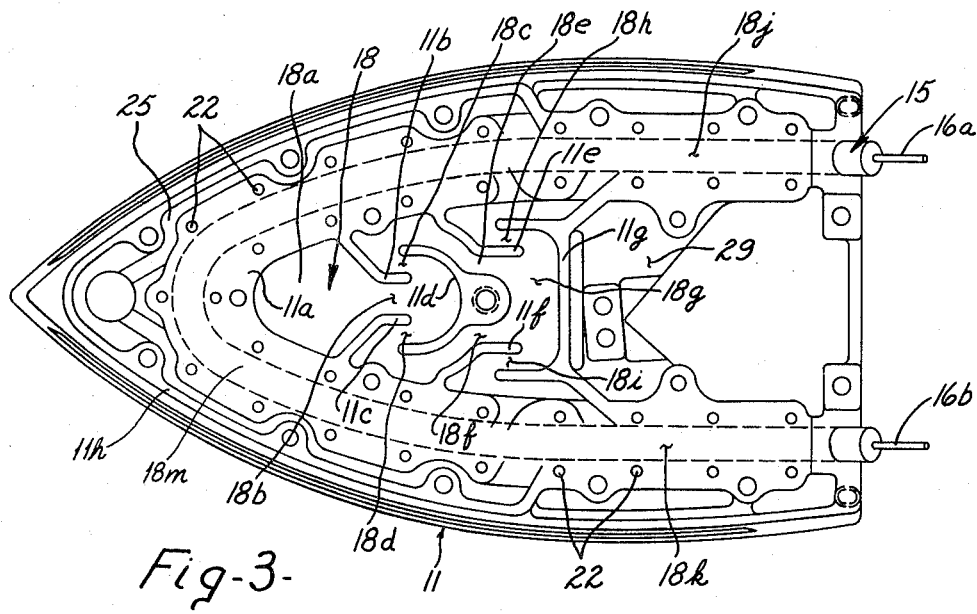
Fig-3-
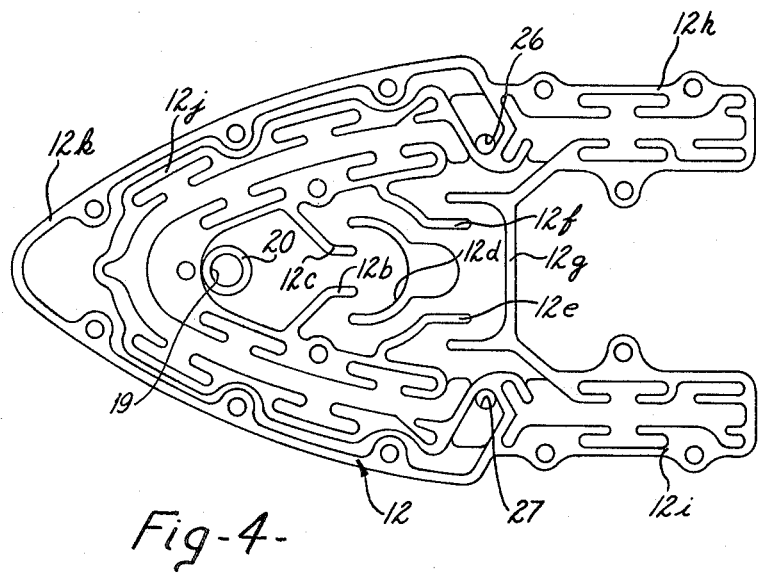
Fig-4-

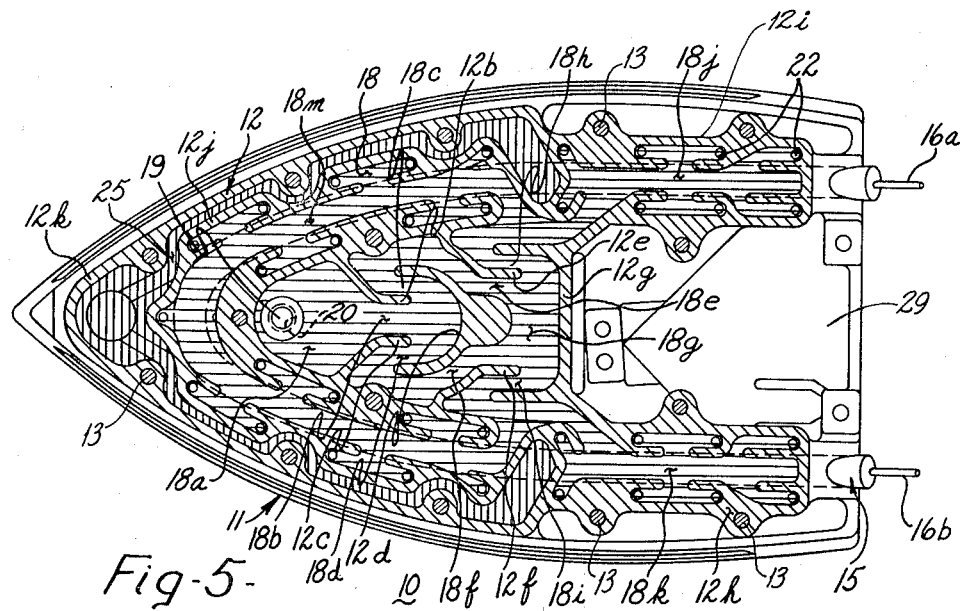
Fig-5-
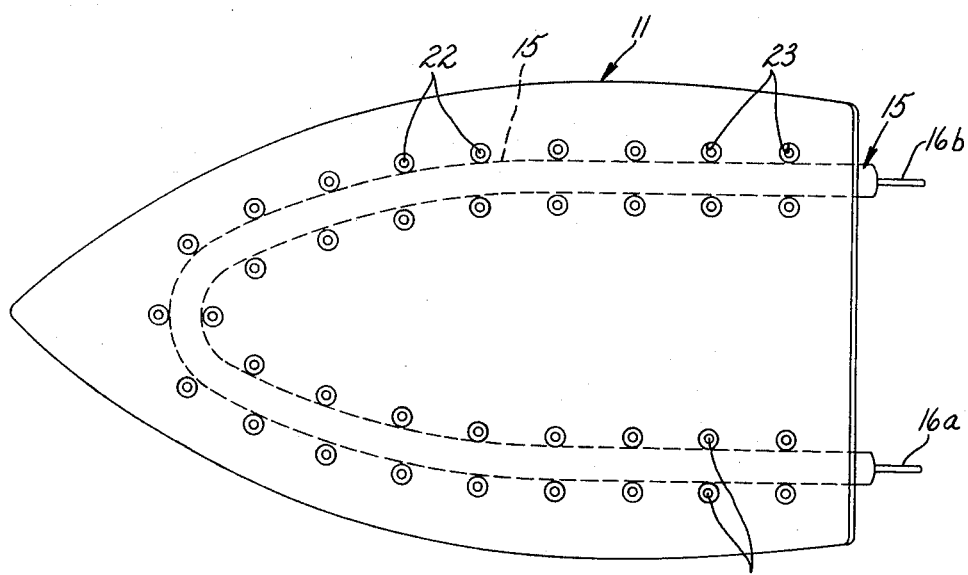
Fig-6-

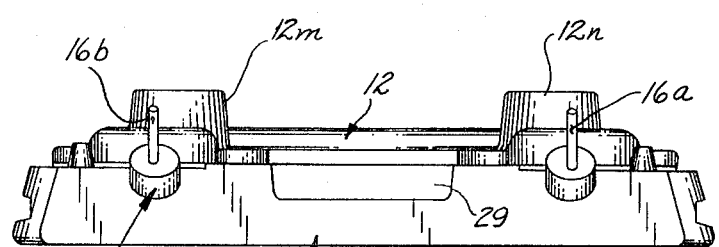
Fig-7-
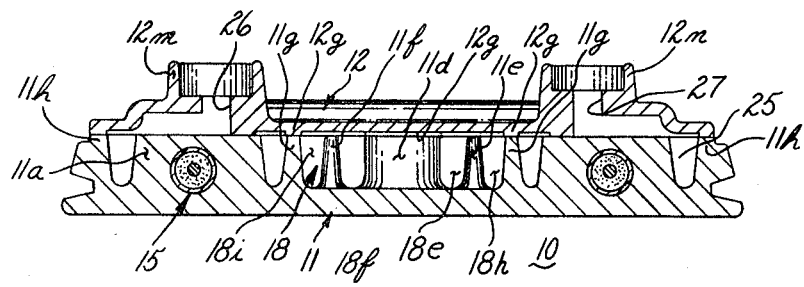
Fig-8-
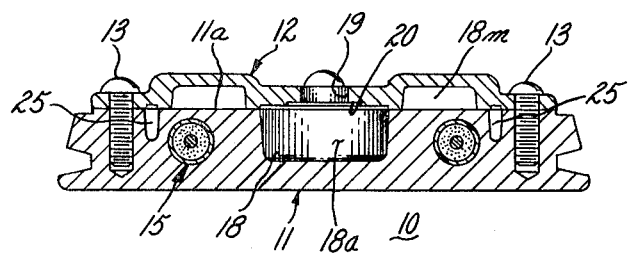
Fig-9-

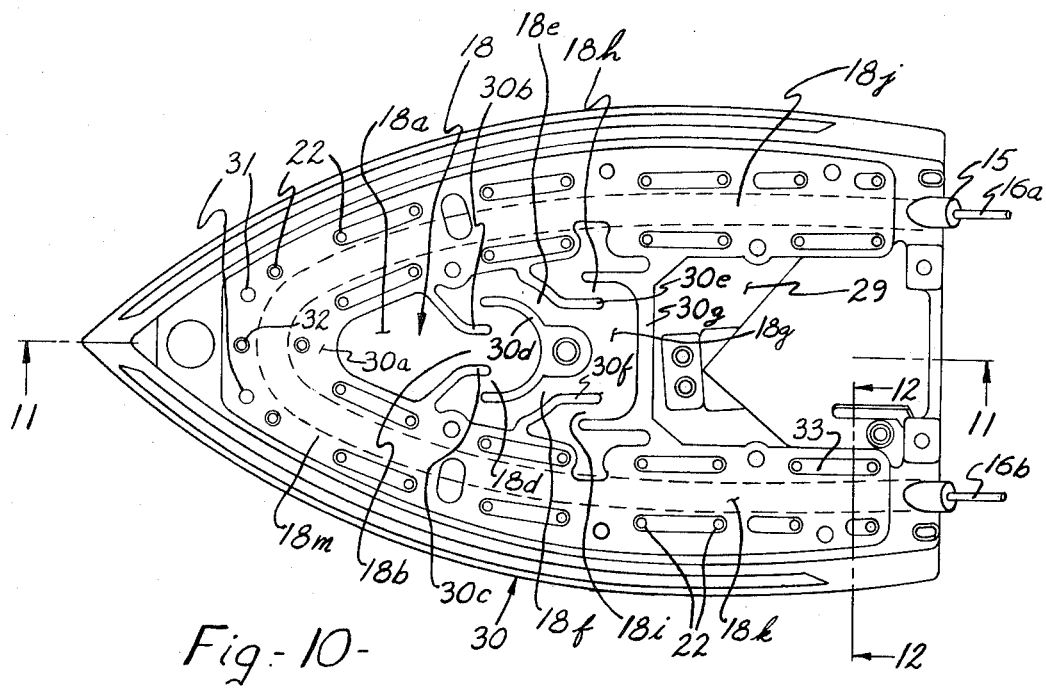
Fig.-10-
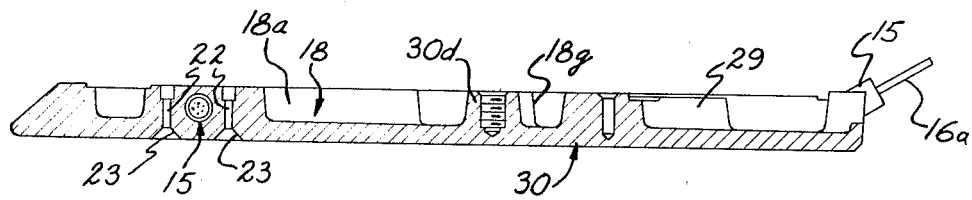
Fig.-11-
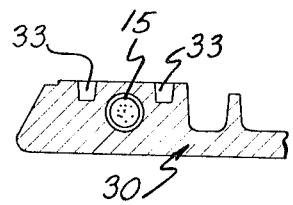
Fig.-12-

Feb. 21, 1967       J. L. VIECELI ETAL       3,304,636
  HEATING AND STEAM GENERATING SUBASSEMBLY FOR A PRESSING IRON
Filed Aug. 5, 1963                          6 Sheets-Sheet 6
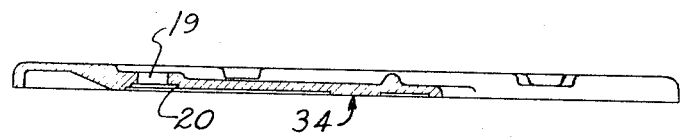
Fig-14-
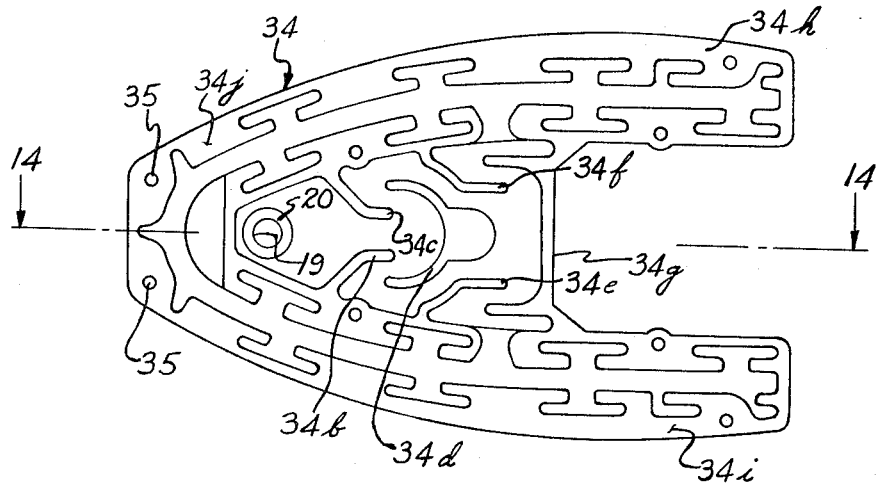
Fig-13-
INVENTORS
JOSEPH L. VIECELI
BY STANLEY WALCZAK
George R. Clark
Attorney United States Patent Office 3,304,636
Patented Feb. 21, 1967

3,304,636
**HEATING AND STEAM GENERATING SUB-
ASSEMBLY FOR A PRESSING IRON**
Joseph L. Vieceli, La Grange, and Stanley Walczak, Chicago, Ill., assignors to Sunbeam Corporation, Chicago, Ill., a corporation of Illinois
Filed Aug. 5, 1963, Ser. No. 299,750
7 Claims. (Cl. 38—77)

The present invention relates to a heating and steam generating subassembly for a pressing iron, and more particularly to a new and improved sole plate for use with a pressing iron of the steam and/or spray type. The present invention is useful with pressing irons such as disclosed and claimed in copending applications, Jepson et al. Serial No. 236,510, filed November 9, 1962, now Patent No. 3,224,122, and Vieceli Serial No. 280,770, filed May 14, 1963, both assigned to the same assignee as the instant application. It is also useful with pressing irons such as disclosed in Jepson et al. Patent No. 2,906,043 also assigned to the same assignee as the instant application.

In the above-mentioned Jepson et al. application there is disclosed a pressing iron wherein the sole plate is provided with two separate flash-type steam generators, one for generating steam to be discharged over the ironing surface as is the case with a conventional steam iron, and the second steam generating chamber for producing steam to power a spray of steam and water as fully disclosed in the above-mentioned copending application. The two steam generating chambers are defined primarily by portions of the sole plate and also by a suitable cover secured to the sole plate, which cover is common to both steam generating chambers. A relatively few openings are provided through the sole plate in the above-mentioned Jepson et al. application which are interconnected by distribution grooves on the pressing surface. While the above-described arrangement gives reasonably good steam distribution, it would be desired to have improved steam distribution over the entire sole plate. Moreover, the features of the present invention are also applicable to pressing irons having only a single steam generating chamber such as those disclosed in the aforementioned Jepson et al. patent and the copending Vieceli application.

Accordingly, it is an object of the present invention to provide a new and improved sole plate and means for defining two separate steam generating chambers therein for a steam and spray iron.

It is another object of the present invention to provide an improved sole plate defining a pair of steam generating chambers wherein one steam generating chamber is effectively against the inner edge and over the top of the heating element, and the other steam generating chamber is effectively against the outer edge of the heating element.

Still another object of the present invention resides in an improved sole plate and steam generating chamber cover which together define a generating chamber disposed substantially over the entire heating element.

It is another object of the present invention to provide an improved sole plate and cover defining therein a steam generating chamber which overlies the entire heating element embedded in the sole plate and includes steam discharge passageways disposed on both sides of the heating element along substantially the entire length thereof.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 1 is a top plan view of a sole plate and steam generating chamber cover secured thereto embodying the present invention;

FIG. 2 is a sectional view taken on line 2—2 of FIG. 1;

FIG. 3 is a top plan view of the sole plate only of FIG. 1 with the steam generating chamber cover removed;

FIG. 4 is a bottom view of the steam generating chamber cover shown in FIGS. 1 and 2;

FIG. 5 is a sectional view taken substantially on line 5—5 of FIG. 2, assuming FIG. 2 shows the complete structure, essentially cutting through the steam generating chamber cover a short distance above the engaging surface of such cover with the sole plate;

FIG. 6 is a bottom view of the sole plate of the present invention;

FIG. 7 is a view looking in the direction of the arrows 7—7 of FIG. 1;

FIG. 8 is a sectional view taken on line 8—8 of FIG. 1;

FIG. 9 is a sectional view taken on line 9—9 of FIG. 1;

FIG. 10 is a top plan view similar to FIG. 3 of the sole plate only with the steam generating chamber cover removed of a modification of the present invention;

FIG. 11 is a sectional view taken on line 11—11 of FIG. 10;

FIG. 12 is a fragmentary sectional view taken on line 12—12 of FIG. 10;

FIG. 13 is a bottom view of the steam generating chamber cover for use with the sole plate of FIG. 10 and is similar to but a modification of FIG. 4; and FIG. 14 is a sectional view taken on line 14—14 of FIG. 13.

Briefly, the present invention is concerned with a sole plate and associated cover for steam generating chambers defined in the sole plate for use in a pressing iron which will function both as a steam and as a dry iron and which will also function as a spray iron when desired. Improved arrangements for producing steam and for better distributing it to the underside of the sole plate are provided. Specifically, the steam is distributed on the underside of the sole plate substantially over the entire area thereof through ports which are disposed along both sides of the heating element and closely adjacent thereto.

Referring now to the drawings, there is illustrated in FIG. 1 a subassembly generally designated at 10, comprising a sole plate 11 and a cover 12 which is secured to the sole plate 11 as by fastening means 13, thereby to define two independent steam generating chambers. The subassembly 10 can be used with the pressing iron of the type shown in the above-mentioned Jepson et al. Patent No. 3,224,122 as well as with the steam and spray iron disclosed and claimed in Jepson and Vieceli application Serial No. 528,691, filed January 17, 1966, now abandoned and also assigned to the same assignee as the instant application. The sole plate 11 is preferably constructed of a lightweight cast metal, such as aluminum or the like, and is heated in a conventional manner by an electric heating element 15 of the sheathed type (FIGS. 1, 2, 3, 5, 6, 7, 8 and 9). Sheathed heating elements are well known and generally comprise a helical resistance conductor centrally disposed within an outer sheath and supported in spaced relationship with respect to such sheath by an electrical insulating material which is also a good heat conductor. Such insulating material may comprise highly compressed magnesium oxide. As in the above-mentioned Jepson et al. copending application, the sheathed heating element 15 has a generally U-shaped configuration (FIGS. 1 and 6) or, in other words, is in the shape of a hairpin. Also, as is best shown in FIGS. 1, 8 and 9, the sole plate 11 is provided with a raised integral somewhat U-shaped rib 11a in which the sheathed heating element 15 is embedded. Projecting from the ends of the sheathed heating element 15 are electrical terminals 16a and 16b (FIGS. 1, 2, 3, 5, 6 and 7) which are electrically connected to the resistance heating element within the sheath of the heating element 15.

For the purpose of producing steam on the flash principle, which steam is supplied beneath the sole plate 11 of the subassembly 10, there is provided a steam generating chamber 18 which is defined by the sole plate 11 and the cover 12. The particular configuration of the steam generating chamber 18, which includes many labyrinth passageways and extensions, is best shown in FIG. 5 by the horizontally shaded portion and is determined by a particular construction of the top of the sole plate 11 and the underside of the cover 12, the latter being best shown in FIG. 4 of the drawings.

Before considering the flow of the water and steam through the steam generating chamber 18, consideration will first be given to the means by which water is initially supplied to the steam generating chamber 18. To this end the cover 12 is provided with an opening 19 which is disposed within the confines of the heating element 15 and adjacent to the bight portion thereof, as is best shown in FIGS. 1 and 2 of the drawings. The underside of the cover 12 surrounding the opening 19 is provided with a shallow counterbore 20, as best shown in FIGS. 2 and 4 of the drawings. The portion of the steam generating chamber directly below the water inlet opening 19 is preferably designated by the reference numeral 18a. By virtue of the rib 11a and corresponding projections on the underside of the cover 12, as best shown in FIGS. 4 and 5 of the drawings, the water which is supplied to the portion 18a of the steam generating chamber can only move rearwardly. The sole plate 11 is provided with a pair of raised projections 11b and 11c and a somewhat arcuate projection 11d (FIG. 3) which cooperate with substantially identical projections 12b, 12c and 12d (FIGS. 4 and 5) to define a pair of tortuous paths whereby water or steam may flow rearwardly through a narrow portion 18b of the steam generating chamber and then forwardly through portions 18c and 18d, as determined by the projections 11b–12b, 11c–12c and 11d–12d of the sole plate 11 and cover 12, respectively.

To further provide tortuous passageways for the flow of steam within the steam generating chamber 18, the sole plate is provided with additional raised winglike projections 11e and 11f, while the cover 12 is provided with cooperating portions 12e and 12f. Additionally, the sole plate is provided with a somewhat U-shaped projection 11g, and the cover 12 is provided with a cooperating U-shaped wall portion 12g which, when the parts are assembled, define, as best shown in FIG. 5 of the drawings, rearwardly directed passageways 18e and 18f which merge into a portion 18g of the steam generating chamber 18 from which forwardly directed portions 18h and 18i extend. The steam, when reaching the portions 18h and 18i of steam generating chamber 18, then flows rearwardly by virtue of the projections 11e and 11f and cooperating portions 12e and 12f of the cover 12, whereupon it may flow to either one of two rearwardly directed portions 18j and 18k or to either leg of a U-shaped forwardly directed portion 18m of the steam generating chamber 18. The passageways 18j, 18k and the U-shaped passageway 18m, as is clearly shown in FIG. 5 of the drawings, are disposed directly over the U-shaped heating element 15, and hence the steam is highly heated in this area.

In accordance with the present invention, a plurality of passageways or steam discharge ports 22 are provided which extend from the portions 18j, 18k and 18m of the steam generating chamber 18 through the sole plate terminating on the ironing surface thereof, as best shown in FIG. 6 of the drawings. These ports terminate in slight conical counterbores 23. No distributing grooves are provided on the underside of the sole plate, but discharge ports 22 and associated conical counterbores 23 are distributed over the entire area of the sole plate with the ports extending on both sides of the heating element 15 and closely adjacent thereto, as is best shown in FIG. 6 of the drawings. The outer boundary of the portions 18j, 18k and 18m of the steam generating chamber 18 is defined by depending wall portions of the cover 12, as best shown in FIGS. 4 and 5 of the drawings, designated as 12h, 12i and 12j, the wall portion 12h being U-shaped and merging with the wall portions 12i and 12j, which latter are also U-shaped and merge with wall section 12g. It will be apparent from the labyrinth-like passages described above that by the time the steam gets to the sections 18j, 18k and 18m of the steam generating chamber 18 it will be converted to dry steam. Moreover, since the steam ports 22 are closely adjacent each side of the sheathed heating element 15, the steam passing through these ports will be maintained in this dry condition. With this arrangement no distributing grooves on the underside of the iron are necessary, which is desirable since the distributing grooves tend to cause wrinkling of the fabric being ironed and to at least some extent decrease the effective ironing area. The steam pressure in the steam generating chamber 18, due to the presence of the continuously open ports 22, is generally less than one pound per square inch.

For the purpose of powering a spray as disclosed in the above-mentioned Jepson et al. copending application, there is provided in the sole plate 11 a second steam generating chamber designated by the reference numeral 25 which is also partially defined by the sole plate 11 and the cover 12. In fact, the second steam generating chamber is defined between rib 11a and outer rib 11h in the sole plate and also by the depending projection 12j of somewhat U-shaped configuration already described and a U-shaped outer depending projection 12k, defining between them the portion of steam generating chamber 25 within cover 12 which also is of generally U-shaped configuration, as best shown by the vertical cross-hatching in FIG. 5 of the drawings. The steam generating chamber 25 is essentially against the outside edge of the heating element 15 except that the steam ports 22 along the outside of the heating element, as best shown in FIG. 6 of the drawings, are interposed between steam generator 25 and the heating element. The steam generating chamber 25 is used, as was mentioned above, to provide steam for powering a liquid spray, and a much higher steam pressure is developed in the spray steam generating chamber 25 than in the steam generating chamber 18.

In order to supply water to the steam generating chamber 25, the cover 12 is provided with an opening 26 surrounded by an enlarged annular ring 12m integrally formed with the cover 12 which defines a recess for a suitable gasket as described in the above-mentioned copending Jepson et al. Patent 3,224,122. Water is, therefore, supplied through the opening 26 to the end of one leg of the U-shaped steam generating chamber 25 and this water is converted into steam and must pass around the entire length of the U-shaped steam generating chamber to the other end of the other leg where a steam outlet opening 27 is provided in the cover 12. This steam outlet opening is also surrounded by an integral ring 12n, as best shown in FIG. 8 of the drawings, for accommodating a suitable gasket associated with the steam connections with the steam generating chamber 25. It will be appreciated that the steam generating chambers 18 and 25 are completely independent of one another and preferably the steam generating chamber 25 operates at a pressure of between thirty and fifty pounds per square inch as contrasted with a much lower pressure such as set forth above in connection with the steam generator 18.

The subassembly 10 comprising the sole plate 11 and the common cover 12 for the two steam generating chambers includes a central recess 29 at the rear thereof between the projecting rear legs of the cover 12 which cover the portions of the steam generating chambers 18j and 18k. It will be understood that the recess 29 accommodates suitable temperature responsive means and the like for controlling the temperature of the sole plate 11. This subassembly 10 and particularly the sole plate 11 is, of course, provided with various projections, tapped openings and the like which form no part of the present invention to accommodate assembly thereof with a water reservoir, handle, cover shell and the like, as well as to facilitate making electrical connections to the heating element 15.

It will be understood that the heating and steam generating subassembly of the present invention is also applicable to steam irons of the type disclosed in the abovementioned Jepson et al. Patent No. 2,906,043 where no spray attachment is employed, and also in connection with the pressing iron of the copending Vieceli application referred to above wherein steam is not employed to power the spray.

In FIGS. 10, 11, 12, 13 and 14 there is illustrated a modification of the present invention wherein only a single steam generating chamber is employed. FIGS. 10, 11 and 12 illustrate the sole plate only of the modification, and FIGS. 13 and 14 illustrate the cover plate for the steam generating chamber only. In view of the detailed description included above, it was felt unnecessary to include a view or views showing these elements in assembled relationship, particularly since they are in most respects very similar to the corresponding parts of FIGS. 1 to 9.

In FIGS. 10, 11 and 12 there is illustrated a sole plate 30 having the identical steam generating chamber 18 described heretofore and designated by the same reference numeral with appropriate letter subscripts as in the prior embodiment. Moreover, the corresponding parts of the sole plate 30 are designated by the same letter subscripts as are the corresponding parts of the sole plate 11 described above. Essentially, the sole plate 30 differs from the sole plate 11 in that the second steam generating chamber 25 is omitted. Consequently, the portion 18m of the steam generating chamber, which is over the top of the heating element 15 has a slightly different outside configuration in FIG. 10 since the fastening means such as 13 pass through openings 31 which are in the area of the portion 18m in FIG. 10 of the drawings but are outside this area in FIG. 3 of the drawings.

The same ports 22 and the conical enlargements 23 are employed as in the preceding embodiment. However, in order to simplify the drilling operations as far as the ports 22 are concerned, the sole plate casting is originally provided with recesses such as 32 and 33. The recesses 32 are merely annular recesses surrounding some of the ports 22, whereas the recesses 33, as best shown in FIG. 10 and 12 of the drawings, are somewhat elongated recesses and most cases interconnect two ports.

The cover plate designated by the reference numeral 34 in FIGS. 13 and 14 of the drawings is very similar to the cover plate 12 previously described except that it, too, has no portion to help define the second steam generating chamber such as 25. The corresponding parts thereof are designated by the reference numeral 34 accompanied by the identical letter subscript employed in the preceding embodiment with respect to cover 12. The same opening 19 is, of course, present to supply water to the portion 18a of the steam generating chamber 18, but the other openings such as 26 and 27 are omitted. The openings 35 correspond to the openings 31 in the sole plate 30 to accommodate the fastening means such as 13 shown in the preceding embodiment.

While there have been shown and described several embodiments of the present invention, it will be apparent to those skilled in the art that various changes and modifications may be made without departing from the invention in its broader aspects, and it is, therefore, contemplated in the appended claims to cover all such changes and modifications as fall within the true spirit and scope of the invention.

What is claimed as new and desired to be secured by Letters Patent of the United States is:

1. For use with a pressing iron, a sole plate, a heating element embedded in said sole plate including terminals accessible from one end of said sole plate, means including portions of said sole plate defining a steam generating chamber extending over substantially the entire embedded portion of said heating element, and a plurality of ports interconnecting said steam generating chamber with the ironing surface of said sole plate, said ports being disposed on both sides of said heating element and distributed along almost the entire length thereof.

2. The apparatus of claim 1 wherein a cover is provided for said steam generating chamber, said steam generating chamber being defined by said portions of said sole plate and said cover, and means for securing said cover to said sole plate.

3. The apparatus of claim 2 wherein said cover is provided with depending projections cooperating with said portions of said sole plate to define tortuous steam passageways in said chamber.

4. For use with a pressing iron, a sole plate, a somewhat U-shaped heating element embedded in said sole plate, means including portions of said sole plate defining a steam generating chamber extending over substantially the entire embedded portion of said U-shaped heating element, said steam generating chamber including a portion disposed adjacent the bight of said U-shaped heating element for receiving water to be converted into steam, means in said chamber for directing the flow of steam rearwardly and forwardly, and a plurality of uniform spaced ports disposed along the inside and outside of said U-shaped heating element interconnecting said steam generating chamber with the ironing surface of said sole plate, said ports being distributed along substantially the entire length of said heating element.

5. For use with a pressing iron, a sole plate, a heating element embedded in said sole plate, means including portions of said sole plate defining a first steam generating chamber extending over substantially the entire embedded portion of said heating element, a plurality of ports interconnecting said steam generating chamber with the ironing surface of said sole plate, said ports being disposed on both sides of said heating element and distributed along substantially the entire length thereof, and means including portions of said sole plate defining a second steam generating chamber at least partially surrounding said first steam generating chamber.

6. A heating and steam generating subassembly for a steam iron, comprising a sole plate, a heating element embedded in said sole plate, means including portions of said sole plate defining a first steam generating chamber extending over substantially the entire embedded portion of said heating element, a cover for said first steam generating chamber, and a plurality of ports interconnecting said first steam generating chamber with the ironing surface of said sole plate, said ports being disposed on both sides of said heating element and distributed along almost the entire length thereof, said sole plate and cover defining a second steam generating chamber independent of the first steam generating chamber.

7. A heating and steam generating subassembly for a steam iron, comprising a sole plate, a U-shaped sheathed heating element embedded in said sole plate, means including portions of said sole plate defining a first steam generating chamber extending over substantially the entire embedded portion of said heating element, a cover for said first steam generating chamber, means for securing said cover to said sole plate, a plurality of ports interconnecting said first steam generating chamber with the ironing surface of said sole plate, said ports being disposed on both sides of said U-shaped heating element and distributed along almost the entire length thereof so as to define two rows of ports with each row of U-shape, and means defining a second U-shaped steam generating chamber disposed around the outer periphery of said U-shaped heating element, said cover being common to both said first and second steam generating chambers.

References Cited by the Examiner

UNITED STATES PATENTS

| | | | |
|---|---|---|---|
| 2,313,382 | 3/1943 | Kistner | 38—77 |
| 2,353,604 | 7/1944 | Waring et al. | 38—77 |
| 2,499,184 | 2/1950 | Finlayson | 38—77 |
| 2,774,156 | 12/1956 | Parr | 38—77 |
| 2,880,530 | 4/1959 | Schwaneke | 38—77 |
| 3,103,079 | 9/1963 | Bricker et al. | 38—77 |
| 3,130,507 | 4/1964 | Hoecker | 38—77 |

PATRICK D. LAWSON, *Primary Examiner.*